P. J. MADDEN.
POTTER'S TOOL.
APPLICATION FILED OCT. 25, 1911.
1,089,846.
Patented Mar. 10, 1914.
2 SHEETS—SHEET 1.
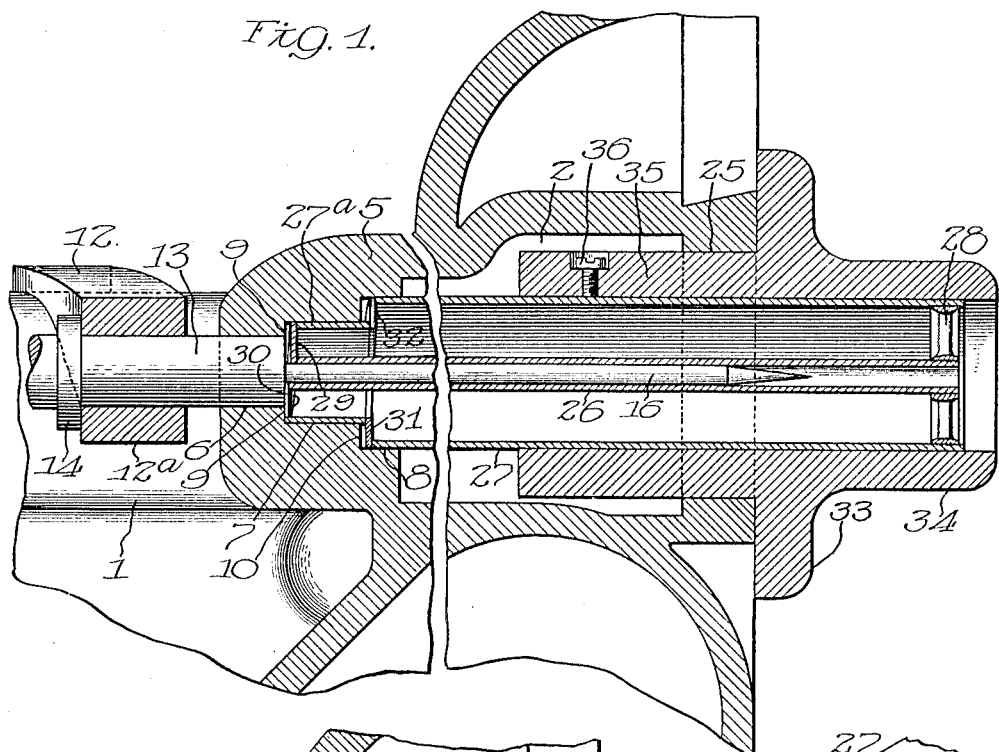
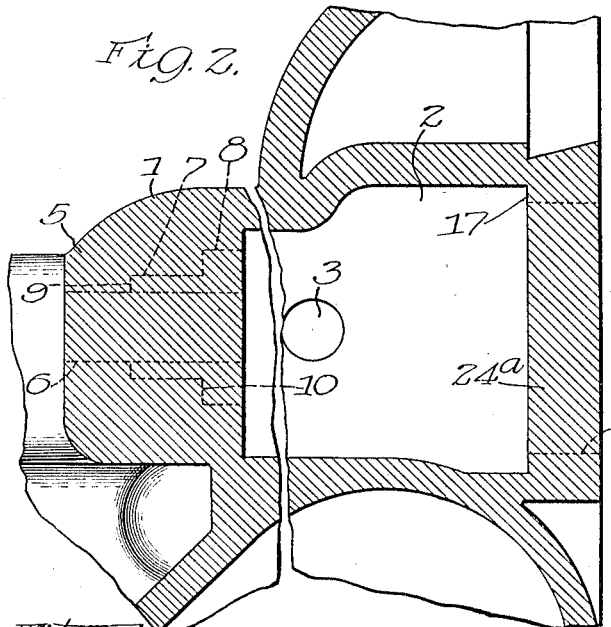
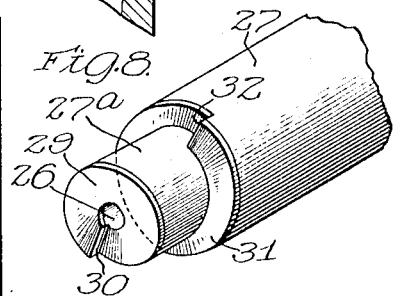
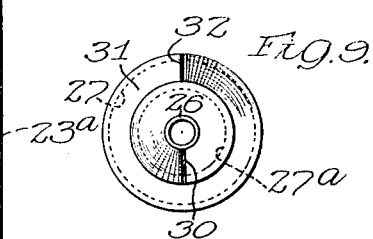

P. J. MADDEN.
POTTER'S TOOL.
APPLICATION FILED OCT. 25, 1911.
1,089,846.
Patented Mar. 10, 1914.
2 SHEETS—SHEET 2.
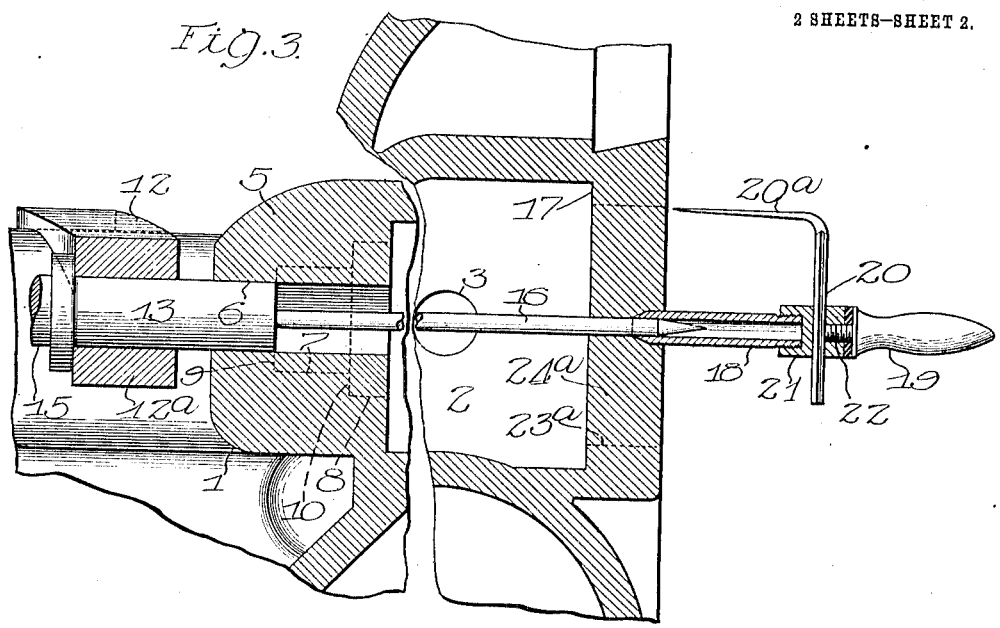
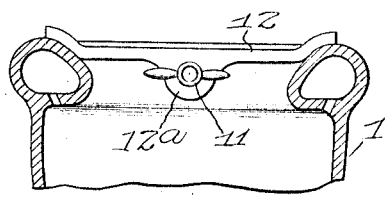
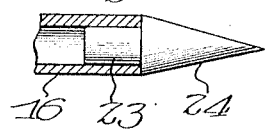
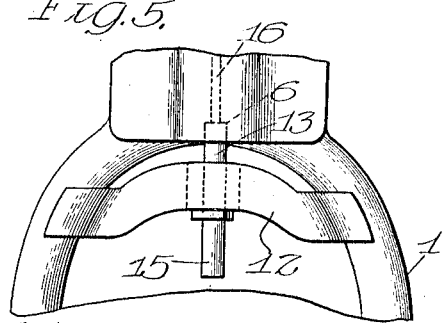
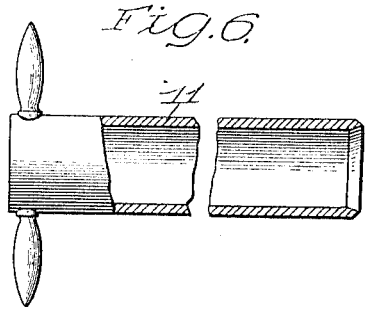
Witnesses:
Inventor:
Patrick J. Madden
By: B. M. Hopkins
Atty:

UNITED STATES PATENT OFFICE.

PATRICK J. MADDEN, OF CHICAGO, ILLINOIS.

POTTER'S TOOL.

1,089,846. Specification of Letters Patent. Patented Mar. 10, 1914.

Application filed October 25, 1911. Serial No. 656,665.

*To all whom it may concern:*

Be it known that I, PATRICK J. MADDEN, a citizen of the United States, residing at Chicago, in the county of Cook and State of Illinois, have invented certain new and useful Improvements in Potters' Tools, of which the following is a specification.

In making pottery such as is extensively used for various plumbing fixtures, it frequently becomes necessary to form openings through webs, or the like, which are opposite each other and a greater or less distance apart, as, for example, the webs which form the opposite walls of a chamber, recess, or the like, in which a valve device or other device is located. These openings must, in some instances, be formed accurately so that their projected axes coincide, as also do any counterbores or annular shoulders resulting from bores of different diameters. These bores and counterbores and their resulting shoulders or sockets sometimes form the bearings or supports for parts of the valve devices which have movable parts the proper operation of which depends upon the freedom of their movement and the absence of binding or sticking resulting from untrueness. In some instances, the valve stems or casings extend completely through such chambers from side to side and are of considerable length, being supported by the opposite walls of the chambers, and, in such instances, in order to afford firm bearings for the casing of the valve device and the valve stem and at the same time avoid the binding or distortion of the casing or stem, the bearings must be accurately formed so that their projected axes are coincident.

The object of the present invention is to provide a tool by which the oppositely located openings with their several bearing surfaces, both lateral and longitudinal, may be accurately formed during the process of molding the article and while the clay is still in a plastic state, and the invention consists in the features of novelty that are hereinafter described with reference to the accompanying drawings which are made a part of this specification and in which:

Figure 1 is a longitudinal section of the principal parts of a tool embodying the invention, and a fragment of a piece of pottery, the parts being in the positions which they occupy when the tool has just completed its operation. Fig. 2 is a vertical section of a piece of pottery having an internal chamber formed during the molding process and indicating by dotted lines the manner in which the walls of the chamber are to be perforated and counterbored. Fig. 3 is a similar view showing one wall of the chamber perforated and the tool in place in readiness to perforate the opposite wall. Figs. 4 and 5, are, respectively, a vertical section looking rearward and a plan view of the bowl of a water closet, on a small scale, and a front elevation and a plan view of a saddle or guiding support for different members of the tool at different stages in its operation. Fig. 6 is a central section of a cylindrical cutter for making the first bore or opening through one wall of the chamber. Fig. 7 is a modification of the means for centering or marking the center for a cutter for making a bore or opening through a second—the opposite wall of the chamber. Fig. 8 is an enlarged perspective view of one end of the auger. Fig. 9 is an enlarged end elevation thereof.

I desire to have it understood that the use of the improved tool is not limited to a fixture of any particular type or construction, but is applicable generally to any fixture or article which has two walls or webs or other portions of whatever name, which are located a greater or less distance apart and are to be provided with openings or sockets or bearing surfaces or other features which must be accurately formed so that their projected axes coincide. In some instances, this accuracy is necessary, or highly desirable, for the purpose of forming tight joints, in some for properly alining the movable parts of a valve device with relation to each other or to some other coöperating part, and in some to avoid hurtful lateral strains upon the parts. I have not attempted to show accurately the details in the construction of any particular fixture and that which is shown is to be taken and understood as merely typical.

A fragment of a bowl which may be of any desired shape or character is shown at 1 and within its upper portion is a chamber, 2, having an opening, 3, for conveying water from the chamber to the hollow rim and an opening (not shown) leading to the siphon jet opening, respectively. This is a more or less diagrammatic representation of the arrangement shown in my former Patent No. 926,887, granted July 6, 1909, and will illustrate the manner of boring and shaping the chamber for receiving a valve device such as is shown in said patent.

As shown in Fig. 2, at one stage during the process of molding the fixture, the chamber, 2, which is to contain the valve device is entirely closed. In order to fit it for the reception of the valve device, its front wall, 5, must be provided with an opening, 6, which is of three diameters—or, in other words, is counterbored at 7 and 8 so as to provide annular shoulders, 9 and 10, respectively. This is done by first boring a hole, 6, completely through the wall, 5, of a single diameter, as shown by dotted lines in Fig. 2, and this is done by a boring tool, 11, which is mounted in a suitable bearing 12ª in a saddle, 12, which rests upon the upper edge of the bowl and is thereby supported in proper position. The saddle has bearing surfaces which conform to the surfaces of those portions of the ware to be treated upon which they rest directly, for the purpose of holding the tool accurately in its proper position from the time the operations are commenced until they are completed. Unless the tool is thus prevented from displacement much of its efficiency will be lost. The soft, plastic condition of the ware at this stage of its completion makes the use of clamping jaws or screws impracticable, but it is found that the use of the saddle having bearing surfaces which are complementary to the surfaces of those portions of the ware with which they have contact, is entirely satisfactory, in that the ware is not marred, while the tool is effectively held against accidental displacement. After this opening, 6, is formed a shank, 13, supported by the saddle, 12, is inserted into the opening, 6, for a short distance, so that the shank is centered and firmly held against lateral movement in the opening. The shank has a flange, 14, which engages the saddle, 12, for limiting its movement and has also a handle, 15, by which it may be grasped. Extending centrally from the shank, 13, is a spindle, 16, which is of sufficient length to extend quite through the chamber, 2, and the wall, 17, thereof, its extremity being pointed so that it will perforate the wall, 17, it being understood that all of the operations herein described take place while the ware is in a plastic state.

Preferably, the spindle, 16, is a solid cylindrical rod pointed at its end and adapted to enter a tube, 18, carried by the stock, 21, of a cutter, 20, and forming its center bearing. The stock has a handle, 19, by which the cutter may be manipulated and is perforated diametrically for the passage of the shank of a blade, 20ª, which latter is held in place by a screw, 22, projecting from the handle and engaging the shank of the blade.

It will be observed that the spindle, 16, not only enters the center bearing of the cutter, but that the center bearing enters the perforation formed by the spindle. Either of these arrangements may be used alone for centering the cutter but both will of necessity be used if the spindle is allowed to remain in place after perforating the rear wall, 17, and the center bearing is long enough to engage the rear surface of said wall, and this is preferable.

If desired, the spindle, 16, may be hollow and adapted to receive the shank, 23, of a removable point, 24, so that when the spindle is thrust through the wall, 17, of a chamber, the point, 24, of the spindle may be removed and the extension, 18, of the cutter fitted in the end of the spindle, 20, with the same result as already described.

In any event, the cutter may be revolved about the spindle, 16, as an axis and at the same time pressed against the wall, 17, of the chamber, so as to cut through the wall in a circular path indicated by the dotted lines, 23ª, in Figs. 2 and 3, and remove a circular section, 24ª, of the wall leaving an opening, 25, the axis of which is coincident with the axis of the opening 6, the opening 25 being, however, of larger diameter than the opening 6 in order to admit the valve casing or other device which is to be contained within the chamber, 2. Having severed the section, 24ª, it is removed together with the cutter, 20, and in place of the cutter an auger is placed upon the spindle, 16, so as to be capable of sliding and rotating thereon. As shown in the drawing this auger has a central tube or sleeve, 26, which fits the spindle, 16, in such manner that the auger may rotate about the spindle and at the same time be held against any considerable lateral movement or play relatively thereto, a tube, 27, of two diameters, and means connecting the tube and sleeve so that they move together as a single element, the connecting means shown in the drawing consisting of a straddle or spider, 28, interposed between the sleeve and tube at one end, and a spiral annulus, 29, interposed between them at the other end, said annulus, 29, being provided with a radial slit, 30, and being twisted to the form of one convolution of a spiral so that it forms a cutting blade resembling the blade of an earth auger leaving an opening between its adjacent ends to permit the dislodged matter to fall into the auger tube.

The tube, 27, has been spoken of as being of two or more diameters. Of course, the result of forming a tube of two diameters is an intervening lateral shoulder and this shoulder may be integral with the other parts of the tube or they may be formed of a separate piece. Preferably, for the purposes of the present invention, the annular shoulder between the portions, 27, and 27ª of the tube consists of an annulus, 31, the margins of which are secured to the adjacent extremities of the tube sections 27 and 27ª, and this annulus is provided with a radial slit, 32, and is bent to form one convolution of a spiral similarly to the annulus 29. For the sake of distributing the strains, the slits, 30 and 32, and the resulting cutting edges or blades are arranged diametrically opposite each other, as shown in Fig. 8. With the auger thus constructed the counterbores 7 and 8 and the resulting shoulders 9 and 10 of the bore or opening 6 are accurately formed so that the bore 6 will receive and guide the projecting stem of a valve device, such as is shown in my patent aforesaid, the counterbores 7 and 8 will receive the main and reduced portions of the valve casing and the shoulder, 10 will form a fixed abutment for a complementary shoulder on the valve casing, a packing ring being interposed between the shoulders, if desired.

In manipulating the tool, the shank, 13, is held in proper position by holding the flange or shoulder, 14, against the saddle, 12, whereby the position of the extremity of the shank, 13, is determined and this, in turn, determines the positions of the shoulders 9 and 10 by the coming in contact of the auger with the end of the shank. This means for determining the positions of the shoulders 9 and 10 depends for its accuracy upon the proper positioning and holding of the saddle, 12, but aside from this means for determining these relations the auger may itself be provided with a flange, 33, which is adapted to bear against the back or outer surface of the wall, 17, or other fixed and determined part of the ware and positively limit the insertion of the auger. This flange, 33, is integral with the handle, 34, of the auger, which is adapted for manual manipulation and is also integral with a sleeve or collar, 35, which is slidably mounted on the tube, 27, of the auger so as to be adjustable longitudinally thereon, a set screw, 36, being provided to hold it to its adjustment. This longitudinal adjustability of the stop, 33, relatively to the cutting blades of the auger is made necessary by differences in the length of the chamber, 2, of different fixtures, but when once this adjustment is accomplished it need not be again altered to meet the requirements of all of the bowls or fixtures of approximately the same size— or, at any rate, intended to receive the same valve device.

It has already been stated that the auger is sustained as against lateral movement by the spindle, 16. It is further sustained by the contact of the sleeve or collar, 35, with the walls of the opening 25 which it fits snugly.

With a tool of the construction shown and described two distantly located openings may be so formed that their projected axes coincide and the various bearing surfaces for a valve device, or similar device, both for accurately determining its position with relation to other parts and for preventing its lateral movement may be easily and quickly formed so that they also coincide with the axes aforesaid.

It will be understood that the saddle, 12, is shaped to conform accurately to that portion of the bowl or other fixture upon which it is intended to rest and that their engaging surfaces are so shaped that they are capable of slipping or sliding relatively to each other, so that the saddle when held down by a slight pressure exerted by the hand of the operator is held in its proper position; that its internally-cylindrical bearing 12ª is accurately located both with relation to the point (at which the opening 6 is to be formed through the front wall 5 of the chamber 2 and also with relation to the point) at which the opening 23ª is to be formed through the rear wall, 17, of the chamber, the projected axis of said bearing being coincident with the axes of the intended openings; and that it is sufficiently long to support the part or member of the tool which occupies it and prevent said part or member from moving laterally. Thus the saddle is an important part of the improved tool since it determines both the relations and the directions of the axes of the openings or bores, counterbores, annular shoulders and other features upon which the accurate mounting of the valve-device or other device depends. It is first used with the cutter 11 and properly centers and guides it in making the first bore or opening 6, after which the cutter 11 is removed. It is then used with the spindle 16 and centers and guides it while it is perforating the rear wall 17 of the chamber. It is then used with the cutter 20 and serves as a pivot about which its blade 20ª moves in cutting the opening 25 through the rear wall of the chamber 2, and it is then used with the auger, centering and guiding it while it is forming the counterbores 7 and 8 and the lateral shoulders 9 and 10. Its greatest utility, however, lies in its finding of the centers, and this done, cutters of other constructions than those shown in the drawings may be used instead of those shown. This is particularly true as to the making of the second opening (25) through the wall of the chamber after the first opening (6) has been made through the opposite wall. Without this saddle or guiding support, or an equivalent guiding device having a fixed relation to the ware, it is practically impossible to make the two openings so that their axes will be exactly at the points at which they must be in order to meet the requirements of the article being treated, especially if the chamber 2 is long. The locating of centers being the thing of prime importance, it is manifest that having perforated the rear wall of the chamber at the proper point, the spindle may be removed and the outline of the opening to be made found and the opening actually made by any suitable means. For example the extension 18 of the cutter may be inserted directly in the perforation made by the spindle, or, using this perforation as a center, the outline for the opening to be made may be marked by a compass or other instrument and the opening actaully made by a knife or other tool.

In the drawings the tubular shell of the auger is shown as being of two diameters, but this is a mere incident to meet the requirements of the particular case for which the tool shown in the drawings in designed, but it is manifest that the tube may be of either a greater or a less number of diameters, according to requirements of individual cases.

What I claim as new and desire to secure by Letters Patent is:

1. A potter's tool adapted to form and counterbore openings through distant oppositely located, relatively fixed walls of a chamber, said tool having, in combination, means for forming an opening through one of said walls, a shank adapted to occupy said opening with a snug fit, whereby it is guided and sustained against lateral movement relatively to the axis of said opening, a spindle carried by the shank and adapted to form a centering perforation through the opposite wall, in line with the projected axis of the opening first aforesaid, and a cutter having a centering bearing adapted to register with said centering perforation and a cutting blade adapted to cut through said wall upon a circular line concentric with said centering perforation and thereby form through said wall an opening whose axis coincides with the projected axis of the opening first aforesaid.

2. A potter's tool adapted to form and counterbore openings through distant oppositely located, relatively fixed walls of a chamber, said tool having, in combination, means for forming an opening through one of said walls, a shank adapted to occupy said opening with a snug fit, whereby it is guided and sustained against lateral movement relatively to the axis of said opening, a spindle carried by the shank and adapted to form a centering perforation through the opposite wall, in line with the projected axis of the opening first aforesaid, and a cutter having a centering bearing adapted to enter said centering perforation, and a cutting blade adapted to cut through said wall upon a circular line concentric with said centering perforation and thereby form through said wall an opening whose axis coincides with the projected axis of the opening first aforesaid.

3. A potter's tool adapted to form and counterbore openings through distant oppositely located, relatively fixed walls of a chamber, said tool having, in combination, means for forming an opening through one of said walls, a shank adapted to occupy said opening with a snug fit, whereby it is guided and sustained against lateral movement relatively to the axis of said opening, a spindle carried by the shank and adapted to form a centering perforation through the opposite wall, in line with the projected axis of the opening first aforesaid, and a cutter having a tubular centering bearing adapted to receive and fit over said spindle, and a cutting blade adapted to cut through said wall upon a circular line concentric with said centering perforation and thereby form through said wall an opening whose axis coincides with the projected axis of the opening first aforesaid.

4. A potter's tool of the class described having, in combination a shank adapted to occupy an opening through one wall of a chamber with a snug fit whereby it is guided and sustained against lateral movement, a spindle carried by the shank and adapted to perforate the opposite wall of the chamber, while still plastic, and a cutter engaging the spindle and adapted to both rotate and move longitudinally relatively thereto, said cutter having a blade adapted to describe a circle as the cutter is rotated.

5. A potter's tool of the class described having, in combination a shank adapted to occupy an opening through one wall of a chamber with a snug fit whereby it is guided and sustained against lateral movement, a spindle carried by the shank and adapted to perforate the opposite wall of the chamber, while still plastic, and a cutter, said spindle and cutter having a socket and a part occupying said socket, respectively, whereby the cutter and spindle may both rotate and move longitudinally relatively to each other, said cutter having a blade adapted to describe a circle as the cutter is rotated.

6. A potter's tool of the class described having, in combination a shank adapted to occupy an opening through one wall of a chamber with a snug fit whereby it is guided and sustained against lateral movement, a spindle carried by the shank and located with its axis coincident with the axis of the opening aforesaid and with a second opening formed through the opposite wall of the chamber, and an auger rotatively mounted on the spindle and having a cutting blade presented endwise.

7. A potter's tool of the class described having, in combination a shank adapted to occupy an opening through one wall of a chamber with a snug fit whereby it is guided and sustained against lateral movement, a spindle carried by the shank and located with its projected axes coincident with the axis of the opening aforesaid and a second opening formed through the opposite wall of the chamber, and an auger rotatively mounted on the spindle and having a cutting blade presented endwise, said auger having both sliding and rotative engagement with the spindle.

8. A potter's tool of the class described having, in combination a shank adapted to occupy an opening through one wall of a chamber with a snug fit whereby it is guided and sustained against lateral movement, a spindle carried by the shank and located with its projected axes coincident with the axis of the opening aforesaid and a second opening through the opposite wall of the chamber, and an auger mounted upon the spindle and having both sliding and rotative engagement therewith, said auger also having both sliding and rotative engagement with the walls of the opening second aforesaid, whereby it is additionally guided and sustained said auger having a cutting blade presented endwise.

9. A potter's tool of the class described having, in combination a shank adapted to occupy an opening through one wall of a chamber with a snug fit whereby it is guided and sustained against lateral movement, a spindle carried by the shank and located with its axis coincident with the projected axis of the opening aforesaid, said auger having both rotative and sliding engagement with the spindle, and a stop for limiting the inward movement of the auger.

10. A potter's tool of the class described having, in combination a shank adapted to occupy an opening through one wall of a chamber with a snug fit whereby it is guided and sustained against lateral movement, a spindle carried by the shank and located with its projected axes coincident with the axis of the opening aforesaid and a second opening formed through the opposite wall of the chamber, said auger having a prehensible part extending outward from the opening last aforesaid, and a stop for limiting the inward movement of the auger.

11. A potter's tool of the class described having, in combination a shank adapted to occupy an opening through one wall of a chamber with a snug fit whereby it is guided and sustained against lateral movement, a spindle carried by the shank and located with is projected axes coincident with the axis of the opening aforesaid and a second opening formed through the opposite wall of the chamber, and an auger having both rotative and sliding engagement with the spindle, said auger having also a sleeve adjustably secured to it and fitting the opening second aforesaid so as to be movable therein, and a prehensible device for rotating it.

12. A potter's tool of the class described having, in combinaion a shank adapted to occupy an opening through one wall of a chamber with a snug fit whereby it is guided and sustained against lateral movement, a spindle carried by the shank and located with its axis coincident with the axis of the opening aforesaid, and an auger mounted upon the spindle so as to be capable of both sliding and rotating thereon, said auger having a sleeve adjustably secured to it and fitting loosely a second opening located with its axis coincident with the axis of the opening first aforesaid, a flange, forming a stop, movable with said sleeve, and a handle movable with said flange.

13. A potter's tool of the class described having, in combination a shank adapted to occupy an opening through one wall of a chamber with a snug fit whereby it is guided and sustained against lateral movement, a spindle carried by said shank and located with its axis coincident with the axis of said opening, an auger engaging said spindle so as to be slidable and rotatable thereon, said auger being formed of a tube and having a cutting blade presented endwise.

14. A potter's tool of the class described having, in combination a shank adapted to occupy an opening through one wall of a chamber with a snug fit whereby it is guided and sustained against lateral movement, a spindle carried by said shank and located with its axis coincident with the projected axes of said opening aforesaid and a second opening formed through the opposite wall of the chamber, an auger having a tube of different diameters, the portions of the different diameters forming shoulders and said shoulders having cutting blades presented endwise.

15. A potter's tool of the class described having, in combination a shank adapted to occupy an opening through one wall of a chamber with a snug fit whereby it is guided and sustained against lateral movement, a spindle carried by the shank and located with its axis coincident with the projected axis of the opening aforesaid, an auger mounted upon the spindle so as to be capable of sliding and rotating thereon, said auger having a tube of plural diameters and opposite portions forming lateral shoulders extending inward from a portion of one diameter to the adjacent portion of the next smaller diameter, said offset portion having a cutting blade presented endwise.

16. A potter's tool of the class described having, in combination a shank adapted to occupy an opening through one wall of a chamber with a snug fit whereby it is guided and sustained against lateral movement, a spindle carried by the shank and located with its axis coincident with the projected axis of the opening aforesaid, and an auger mounted upon a spindle so as to be capable of both sliding and rotating thereon, said auger having a tube of a plurality of diameters, a central sleeve surrounding the spindle, an annulus secured to one end of the sleeve and to the end of the tube, said annulus being split to provide a cutting edge and an opening communicating with the interior of the auger, and a second annulus, similar to the annulus aforesaid, secured at its edges to the adjacent portions of the tube of different diameters.

17. A potter's tool of the class described having, in combination, a saddle having a bearing surface adapted to rest upon a piece of ware having oppositely located, relatively fixed walls, said saddle having also an elongated bearing, a tool adapted to fit snugly in said bearing and form an opening through the near wall of the ware, a shank adapted to fit snugly in said bearing and in the perforation formed as aforesaid, a spindle carried by the shank and located with its axis coincident therewith and with the bearing of the saddle, said spindle being adapted to form a centering perforation through the far wall of the ware, a cutter having a centering pin adapted to register with said centering perforation, and a knife adapted to cut through the far wall of the ware and form an opening the axis of which is coincident with the projected axis of the opening first aforesaid and of the bearing of the saddle, and an auger, said auger having a central sleeve adapted to receive and fit said spindle, a tubular body, a cutting blade at one end of the body, a collar secured to the body and adapted to fit snugly the opening through the rear wall of the ware, and a prehensible device.

PATRICK J. MADDEN.

Witnesses:
WILLIAM J. SPILLANE,
HENRY W. LEWIS.

Copies of this patent may be obtained for five cents each, by addressing the "Commissioner of Patents, Washington, D. C."